United States Patent
Nakayama et al.

(10) Patent No.: US 10,826,046 B2
(45) Date of Patent: Nov. 3, 2020

(54) BUS BAR AND POWER STORAGE MODULE

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventors: Osamu Nakayama, Yokkaichi (JP); Naoki Fukushima, Yokkaichi (JP); Katsushi Miyazaki, Yokkaichi (JP); Seishi Kimura, Yokkaichi (JP)

(73) Assignees: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 218 days.

(21) Appl. No.: 15/778,837

(22) PCT Filed: Nov. 25, 2016

(86) PCT No.: PCT/JP2016/084896
§ 371 (c)(1),
(2) Date: May 24, 2018

(87) PCT Pub. No.: WO2017/104378
PCT Pub. Date: Jun. 22, 2017

(65) Prior Publication Data
US 2018/0358603 A1 Dec. 13, 2018

(30) Foreign Application Priority Data
Dec. 15, 2015 (JP) .................................. 2015-243909

(51) Int. Cl.
*H01M 2/26* (2006.01)
*B23K 26/06* (2014.01)
(Continued)

(52) U.S. Cl.
CPC ........... *H01M 2/26* (2013.01); *B23K 26/0604* (2013.01); *B23K 26/22* (2013.01); *B23K 26/244* (2015.10);
(Continued)

(58) Field of Classification Search
None
See application file for complete search history.

(56) References Cited

U.S. PATENT DOCUMENTS

| | | | | |
|---|---|---|---|---|
| 6,390,830 B1 * | 5/2002 | Onizuka | .............. | H01R 9/2458 439/721 |
| 2012/0231320 A1 * | 9/2012 | Heck | ..................... | H01M 2/206 429/121 |

(Continued)

FOREIGN PATENT DOCUMENTS

| JP | 2012179631 A | 9/2012 |
|---|---|---|
| JP | 2016129125 A | 7/2016 |

OTHER PUBLICATIONS

International Search Report and Written Opinion for Application No. PCT/JP2016/084896 dated Feb. 7, 2017; 7 pages.

*Primary Examiner* — Victoria H Lynch
(74) *Attorney, Agent, or Firm* — Reising Ethington, P.C.

(57) ABSTRACT

A bus bar includes a metal plate material. A plate face of the metal plate material includes a recessed portion. An inner wall of the recessed portion includes a first light-receiving face that is inclined relative to the plate face so as to receive a laser light beam L1 extending in a direction perpendicular (Continued)

to the plate face, and a second light-receiving face for receiving the laser light beam L1 that has reflected off the first light-receiving face.

4 Claims, 9 Drawing Sheets

(51) Int. Cl.

| | |
|---|---|
| *B23K 26/244* | (2014.01) |
| *H01G 11/74* | (2013.01) |
| *H01G 9/008* | (2006.01) |
| *H01R 43/02* | (2006.01) |
| *B23K 33/00* | (2006.01) |
| *H01M 2/10* | (2006.01) |
| *H01G 11/84* | (2013.01) |
| *H01G 13/00* | (2013.01) |
| *H01M 2/20* | (2006.01) |
| *B23K 26/22* | (2006.01) |
| *H01G 2/02* | (2006.01) |
| *H01R 4/58* | (2006.01) |
| *B23K 101/28* | (2006.01) |
| *B23K 101/38* | (2006.01) |
| *B23K 103/12* | (2006.01) |
| *B23K 101/18* | (2006.01) |
| *H01R 4/02* | (2006.01) |

(52) U.S. Cl.
CPC ............... *B23K 33/00* (2013.01); *H01G 2/02* (2013.01); *H01G 9/008* (2013.01); *H01G 11/74* (2013.01); *H01G 11/84* (2013.01); *H01G 13/00* (2013.01); *H01G 13/006* (2013.01); *H01M 2/1077* (2013.01); *H01M 2/202* (2013.01); *H01M 2/206* (2013.01); *H01R 4/58* (2013.01); *H01R 43/0221* (2013.01); *B23K 2101/18* (2018.08); *B23K 2101/28* (2018.08); *B23K 2101/38* (2018.08); *B23K 2103/12* (2018.08); *H01R 4/029* (2013.01)

(56) References Cited

U.S. PATENT DOCUMENTS

| | | |
|---|---|---|
| 2013/0260212 A1 | 10/2013 | Kohno et al. |
| 2013/0344378 A1 | 12/2013 | Kohara et al. |
| 2015/0228957 A1 | 8/2015 | Jeong et al. |

* cited by examiner

BUS BAR AND POWER STORAGE MODULE

CROSS REFERENCE TO RELATED APPLICATIONS

This application claims the priority of Japanese patent application JP2015-243909 filed on Dec. 15, 2015, the entire contents of which are incorporated herein.

TECHNICAL FIELD

This specification discloses a technique that relates to a bus bar for energization.

BACKGROUND ART

Conventionally, a technique for connecting a bus bar for energization to a counterpart terminal by means of laser welding is known. Patent Document 1 (JP 2012-92405A) describes a copper plate material for laser welding that is constituted by a copper substrate that is made of a copper material or a copper alloy material, a copper oxide film that is formed on a surface of the copper substrate, and a carbon film that is formed on an outermost surface of the copper substrate via the copper oxide film. The copper plate material for laser welding reduces the laser light reflectivity using the carbon film formed on the outermost surface of the copper substrate.

SUMMARY

However, in the case of increasing the laser light absorptivity in the bus bar by forming a film on the surface of the copper substrate to reduce the laser light reflectivity as in Patent Document 1, the manufacturing cost increases as a result of the material and processes for forming the film.

The technique described in this specification has been finished based on the foregoing situation, and aims to provide a bus bar with which the laser light absorptivity can be increased while suppressing the manufacturing cost.

A bus bar described in this specification is a bus bar that includes a metal plate material, wherein the metal plate material includes a first plate face and a second plate face, the first plate face including a recessed portion, and an inner wall of the recessed portion includes a first light-receiving face that is inclined relative to the plate faces so as to receive a laser light beam extending in a direction perpendicular to the plate faces, and a second light-receiving face that receives the laser light beam that has reflected off the first light-receiving face.

With this configuration, since the laser light beam that has reflected off the first light-receiving face is received by the second light-receiving face, the laser light absorptivity can be increased without necessarily forming a film on the first plate face. Accordingly, the laser light absorptivity can be increased while suppressing the manufacturing cost.

The following modes are favorable as modes of carrying out the technique described in this specification.

The second light-receiving face is inclined relative to the first plate face, in an orientation in which the second light-receiving face reflects the laser light beam outward.

With this configuration, the second light-receiving face can be readily molded, compared with a configuration in which the second light-receiving face is arranged in a direction perpendicular to the first plate face of the bus bar, for example.

The inner wall of the recessed portion includes a flat face that is substantially parallel to the first plate face.

With this configuration, since the plate thickness is small in the region of the recessed portion in which the flat face is formed, the bus bar can be reliably connected to a counterpart member by means of laser welding.

A protruding portion is formed at a position corresponding to the recessed portion, in the second plate face on a side opposite to the first plate face on a side on which the recessed portion is formed.

With this configuration, the portion in which the laser light beam is absorbed can be reliably brought into contact with a counterpart member.

A projecting portion is provided in the inner wall of the recessed portion, and the projecting portion includes an inclined face that is inclined relative to the first plate face so as to receive a laser light beam extending in a direction perpendicular to the first plate face.

With this configuration, laser welding can be appropriately performed even if the position to which the laser light beam is applied has been shifted.

A power storage module includes the above-described bus bar, and a power storage element that includes positive and negative electrode terminals, wherein the bus bar is laser-welded to the electrode terminals.

The technique described in this specification can suppress the manufacturing cost and increase the laser light absorptivity.

DESCRIPTION OF EMBODIMENTS

Embodiment 1

Embodiment 1 will be described with reference to FIGS. 1 to 9.

A power storage module 10 according to this embodiment is mounted in a vehicle such as an automobile, and is used as a power source for driving the vehicle, for example. In the following description, an X direction, a Y direction, and a Z direction refer to a rightward direction, a forward direction, and an upward direction, respectively, for example.

Figure 1:
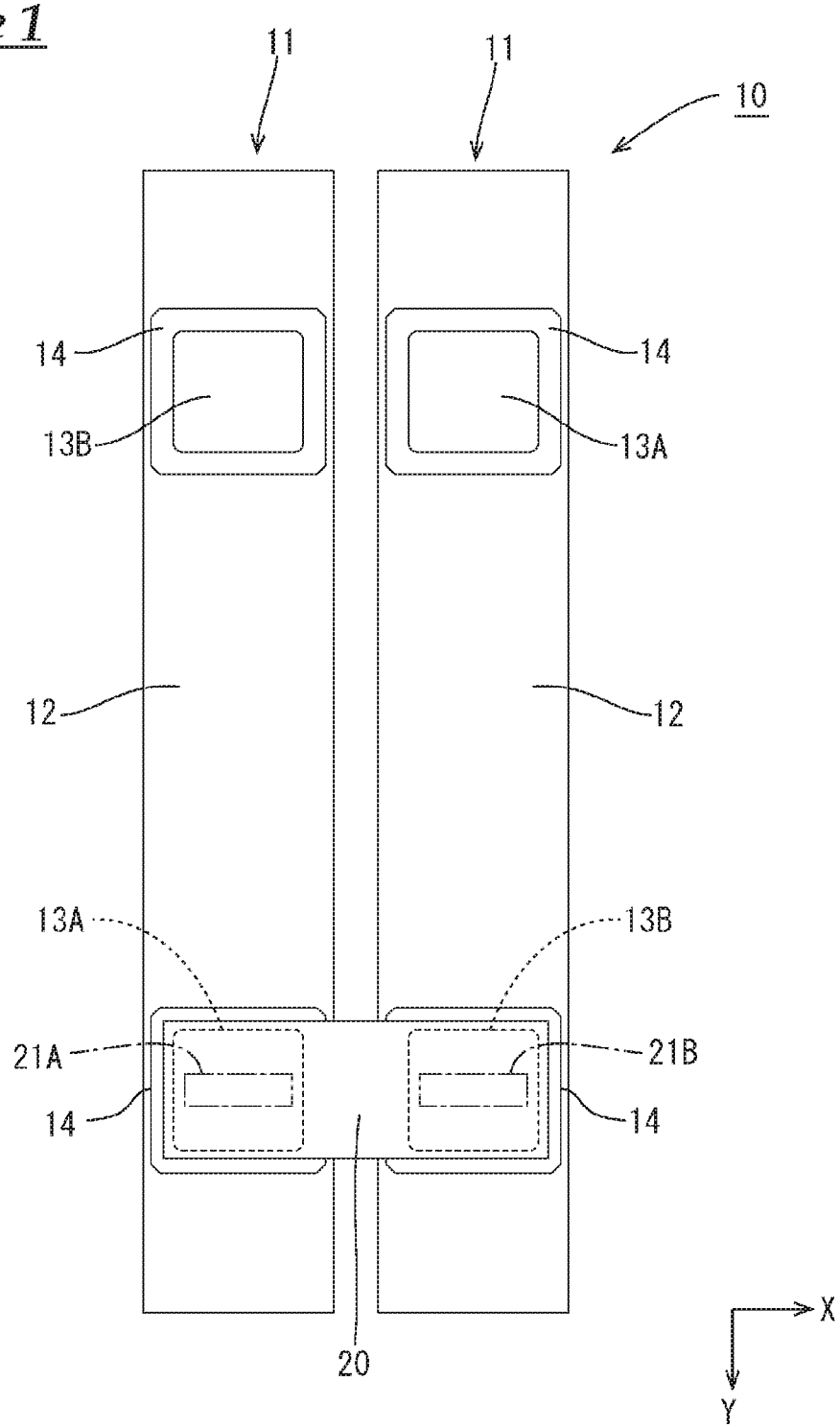
FIG. 1 is a plan view of a power storage module according to Embodiment 1.

As shown in FIG. 1, the power storage module 10 includes a plurality of power storage elements 11, which are arranged in a line in a left-right direction, and a bus bar 20 for connecting electrode terminals 13A and 13B in adjoining power storage elements 11 to each other.

Each power storage element 11 includes a body portion 12, which has a flat, rectangular parallelepiped shape in which a power storage member (not shown) is accommodated, and electrode terminals 13A and 13B (shown as a positive electrode terminal 13A and a negative electrode terminal 13B), which protrude from one face of the body portion 12. In the electrode terminals 13A and 13B, rectangular leading end faces thereof (upper end faces) are exposed, and the peripheries thereof, which are portions other than leading end portions, are covered with an insulating synthetic resin 14. As for the orientation of adjoining power storage elements 11, the power storage elements 11 are arranged so that the electrode terminals 13A and 13B with opposite polarities are adjacent to each other. Thus, the plurality of power storage elements 11 are connected in series. The electrode terminals 13A and 13B that are located at an end portion in the series connection are connected to an external device, such as an inverter, via electric wires (not shown).

The bus bar 20 has a rectangular shape, and is formed using a metal plate material that is made of copper, a copper alloy, aluminum, an aluminum alloy, stainless steel (SUS), or the like, for example. Plating of tin, nickel, or the like is not formed on the bus bar 20, and a metal face thereof is in an exposed state. The bus bar 20 has a thickness corresponding to the value of the current that is to flow therethrough, and has a size with which the bus bar 20 covers the entire leading end faces of a pair of left and right electrode terminals 13A and 13B. The bus bar 20 has predetermined welding regions 21A and 21B, which are to be laser-welded to the electrode terminals 13A and 13B, each serving as a counterpart member. The bus bar 20 is connected to the electrode terminals 13A and 13B by means of laser welding in which laser light beams L1 and L2 are applied to the welding regions 21A and 21B.

Figure 2:
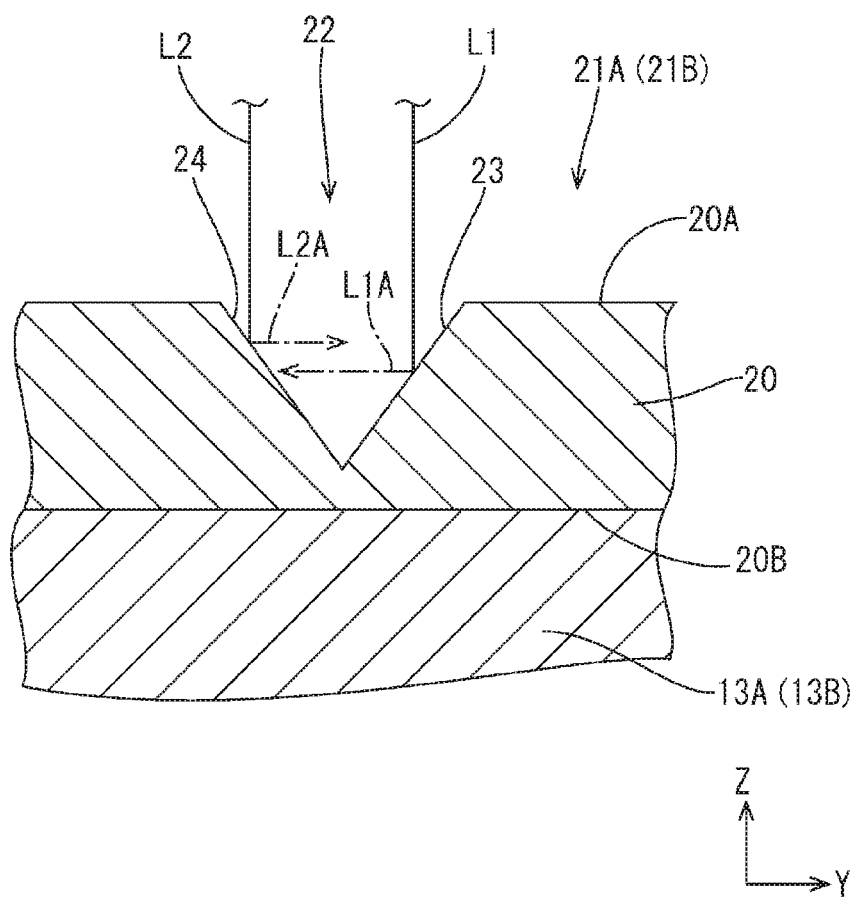
FIG. 2 is a cross-sectional view enlarging a state where a bus bar that includes a recessed portion is placed on an electrode terminal.

A large number (plurality) of recessed portions 22 are formed in the welding regions 21A and 21B in an upper plate face 20A (first plate face), of the upper plate face 20A (first plate face) and a lower plate face 20B (second plate face), as shown in FIG. 2. Each recessed portion 22 has a cross-sectional shape that is formed by cutting out the bus bar 20 into a triangular shape on the upper face side thereof, and extends in a groove shape in a left-right direction. Due to each recessed portion 22 extending in a groove shape in the left-right direction, laser welding can be efficiently performed from one of the pair of the left and right welding regions 21A and 21B to the other one thereof.

An inner wall of each recessed portion 22 includes a first light-receiving face 23, which is inclined relative to the plate face 20A so as to receive the laser light beam L1 extending in a direction perpendicular to the plate face 20A, and a second light-receiving face 24 for receiving the laser light beam L1 that has reflected off the first light-receiving face 23. The first light-receiving face 23 and the second light-receiving face 24 have shapes that are symmetrical about an intermediate plane, and the absolute values of the inclination angle thereof relative to the plate face 20A are the same. It is favorable that the angle between the first light-receiving face 23 and the second light-receiving face 24 is an angle smaller than or equal to 90 degrees. Thus, the laser light beam L1 applied to the first light-receiving face 23 from a direction perpendicular to the plate face 20A is partially absorbed by the first light-receiving face 23, and the remainder acts as a reflected laser light beam L1A, which is applied to the second light-receiving face 24. The laser light beam L1A received by the second light-receiving face 24 is partially absorbed by the second light-receiving face 24, and the remainder is reflected outward. Note that, when a laser light beam L2 is applied toward the second light-receiving face 24 side, the second light-receiving face 24 serves as the first light-receiving face, and the first light-receiving face 23 that receives a laser light beam L2A that has reflected off this first light-receiving face (second light-receiving face 24) serves as the second light-receiving face.

In the above description, each recessed portion 22 has a groove shape extending in the left-right direction, but the present invention is not limited thereto, and each recessed portion 22 may also extend in the front-rear direction, for example. The shape of each recessed portion 22 is not limited to a groove shape, and may also be a cut-out shape that is a circular cone shape, or a pyramid shape such as a triangular cone or a square cone that expands upward, for example.

Note that a voltage detection terminal (not shown) for detecting the voltage of each power storage element 11 may also be placed over the bus bar 20. An electric wire that is connected to this voltage detection terminal is connected to an external ECU (Electronic Control Unit; not shown). This ECU is one on which a microcomputer, an element, or the like is mounted, and has a known configuration that has the functions of, for example, detecting a voltage, current, temperature, or the like of each power storage element 11, and controlling charging and discharging of each power storage element 11.

Next, assembly of the power storage module 10 will be described.

A metal plate material is pressed using a pressing machine to form a plurality of recessed portions 22 in the welding regions 21A and 21B. Next, the bus bar 20 is placed on adjoining electrode terminals 13A and 13B in a plurality of power storage elements 11. The laser light beams L1 and L2 are applied to one of the welding regions, i.e. the welding region 21A while moving the laser light beams L1 and L2 in the left-right direction, for example, and thereafter, the laser light beams L1 and L2 are applied to the other one of the welding regions, i.e. the welding region 21B while moving the laser light beams L1 and L2 in the left-right direction, for example. Thus, the pair of welding regions 21A and 21B of the bus bar 20 are connected to the electrode terminals 13A and 13B by means of welding. As a result, the power storage module 10 is formed. This power storage module 10 is mounted at a predetermined position in the vehicle.

According to this embodiment, the following effects are exhibited.

The bus bar 20 includes a metal plate material, and the plate face 20A of the metal plate material has the recessed portions 22. An inner wall of each recessed portion 22 includes a first light-receiving face 23, which is inclined relative to the plate face 20A so as to receive the laser light beams L1 and L2 extending in a direction perpendicular to the plate face 20A, and a second light-receiving face 24 for receiving the laser light beams L1 and L2A that have reflected off the first light-receiving face 23.

With this configuration, since laser light beams L1 and L2A that have reflected off the first light-receiving face 23 are received by the second light-receiving face 24, the absorptivity for the laser light beam L1 and L2 can be increased without necessarily forming a film on the plate face 20A. Accordingly, the absorptivity for the laser light beam L1 and L2 can be increased while suppressing the manufacturing cost.

The second light-receiving face 24 is inclined relative to the plate face 20A, in an orientation in which the second light-receiving face 24 reflects the laser light beams L1 and L2 outward.

With this configuration, the second light-receiving face 24 can be readily molded, compared with a configuration in which the second light-receiving face 24 is arranged in a direction perpendicular to the plate face 20A of the bus bar 20, for example.

Embodiment 2

Next, Embodiment 2 will be described with reference to FIG. 3. Unlike Embodiment 1, Embodiment 2 has a configuration in which an inner wall of each recessed portion 31 includes a flat face 32. Since other elements are the same as those in Embodiment 1, the same elements as those in Embodiment 1 are assigned the same signs, and descriptions thereof are omitted.

Figure 3:
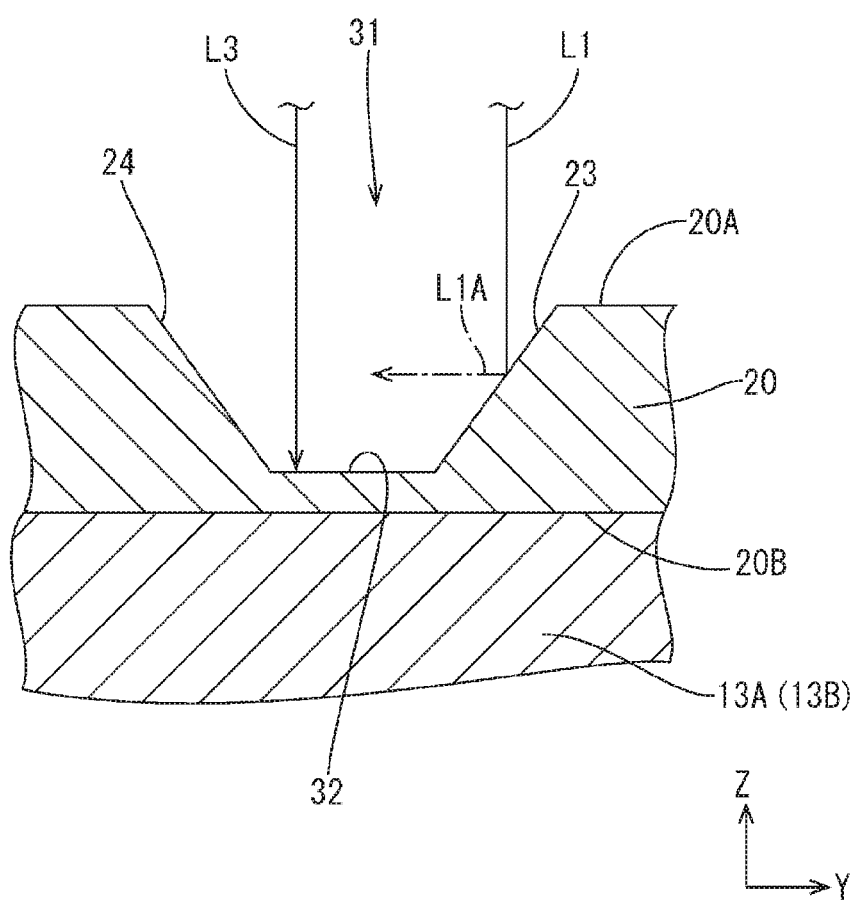
FIG. 3 is a cross-sectional view enlarging a state where a bus bar that includes a recessed portion according to Embodiment 2 is placed on an electrode terminal.

As shown in FIG. 3, the flat face 32 is formed between the first light-receiving face 23 and the second light-receiving face 24 in the inner wall of each recessed portion 31 of a bus bar 30. The flat face 32 is parallel or almost parallel to the plate faces 20A and 20B (substantially parallel to the plate faces 20A and 20B), and the plate thickness of the bus bar 30 is thin and is fixed in the region of this flat face 32. A laser light beam L3 that is applied to this flat face 32 is partially absorbed by a portion including the flat face 32, and the remainder is reflected.

According to Embodiment 2, due to each recessed portion 31 including the flat face 32 that is substantially parallel to the plate face 20A, the plate thickness is thin in the region in which the flat face 32 is formed. Thus, connection to a counterpart member by means of laser welding can be reliably performed.

Embodiment 3

Next, Embodiment 3 will be described with reference to FIG. 4. In Embodiment 3, a protruding portion 41, which corresponds to each recessed portion 22, is formed in the lower plate face 20B of a bus bar 40 in Embodiment 1. The same elements as those in the above embodiments are assigned the same signs, and descriptions thereof are omitted.

Figure 4:
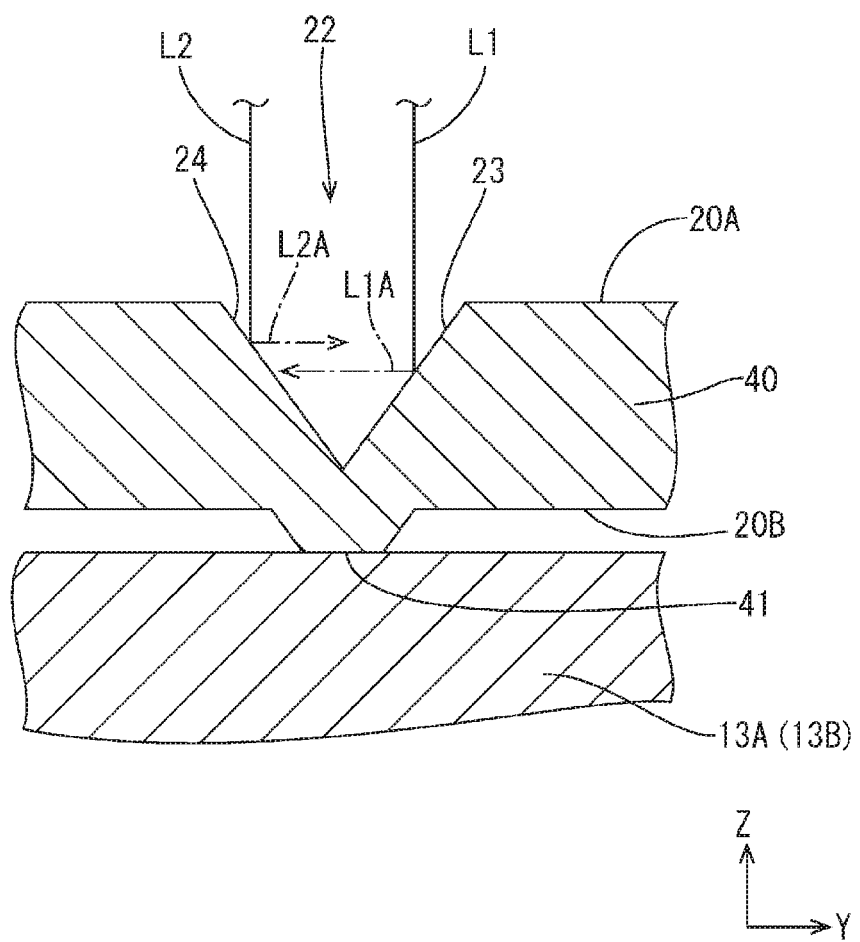
FIG. 4 is a cross-sectional view enlarging a state where a bus bar that includes a recessed portion according to Embodiment 3 is placed on an electrode terminal.

As shown in FIG. 4, the protruding portion 41 (protrusion) is formed in the plate face 20B of the bus bar 40 on the side opposite to the portion in which the recessed portion 22 is formed. The protruding portion 41 is slightly tapered on a leading end side thereof, and a lower end face thereof has a flat shape parallel to the plate face 20B. The protruding portion 41 linearly extends along the recessed portion 22, relative to the groove-shaped recessed portion 22. Note that, if the recessed portion 22 has a shape other than a groove shape, the protruding portion is formed corresponding to the shape of the recessed portion. The protruding portion 41 can be molded simultaneously with the recessed portion 22 during the pressing process, but the present invention is not limited thereto, and the protruding portion 41 may also be molded in a process other than the process for molding the recessed portion 22.

According to Embodiment 3, the protruding portion 41 is formed at a position corresponding to the recessed portion 22, in the plate face 20B of the bus bar 40 on the side opposite to the plate face 20A on the side on which the recessed portion 22 is formed. Accordingly, the portions at which the laser light beams L1 and L2 are absorbed can be reliably brought into contact with the electrode terminals 13A and 13B (counterpart member).

Embodiment 4

Next, Embodiment 4 will be described with reference to FIG. 5. The same elements as those in the above embodiments are assigned the same signs, and descriptions thereof are omitted.

Figure 5:
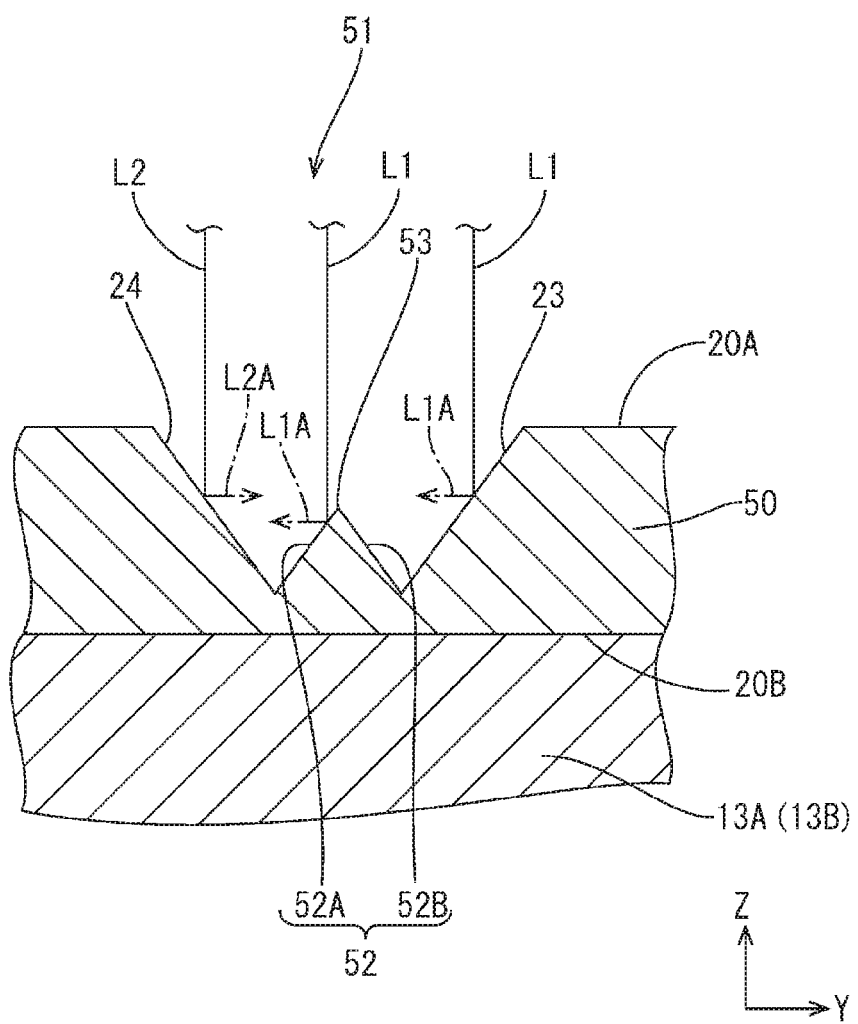
FIG. 5 is a cross-sectional view enlarging a state where a bus bar that includes a recessed portion according to Embodiment 4 is placed on an electrode terminal.

As shown in FIG. 5, a projecting portion 52 that projects upward is provided in an inner wall of each recessed portion 51 of a bus bar 50. The projecting portion 52 is provided in an intermediate portion between the first light-receiving face 23 and the second light-receiving face 24, and includes a pair of left and right inclined faces 52A and 52B. A leading end 53 is formed at a position lower than the upper plate face 20A of the bus bar 50.

According to Embodiment 4, the projecting portion 52 is provided in the inner wall of each recessed portion 22 of the bus bar 50. This projecting portion 52 includes the inclined faces 52A and 52B that are inclined relative to the plate face 20A so as to receive the laser light beams L1 and L2 extending in a direction perpendicular to the plate face 20A.

With this configuration, the laser light beams L1 and L2 that are applied to the inclined faces 52A and 52B of the projecting portion 52 in the recessed portion 22 can be reflected toward the inner wall of the recessed portion 22. Accordingly, laser welding can be appropriately performed even if the position to which the laser light beam L1 is applied has been shifted.

Embodiment 5

Figure 6:
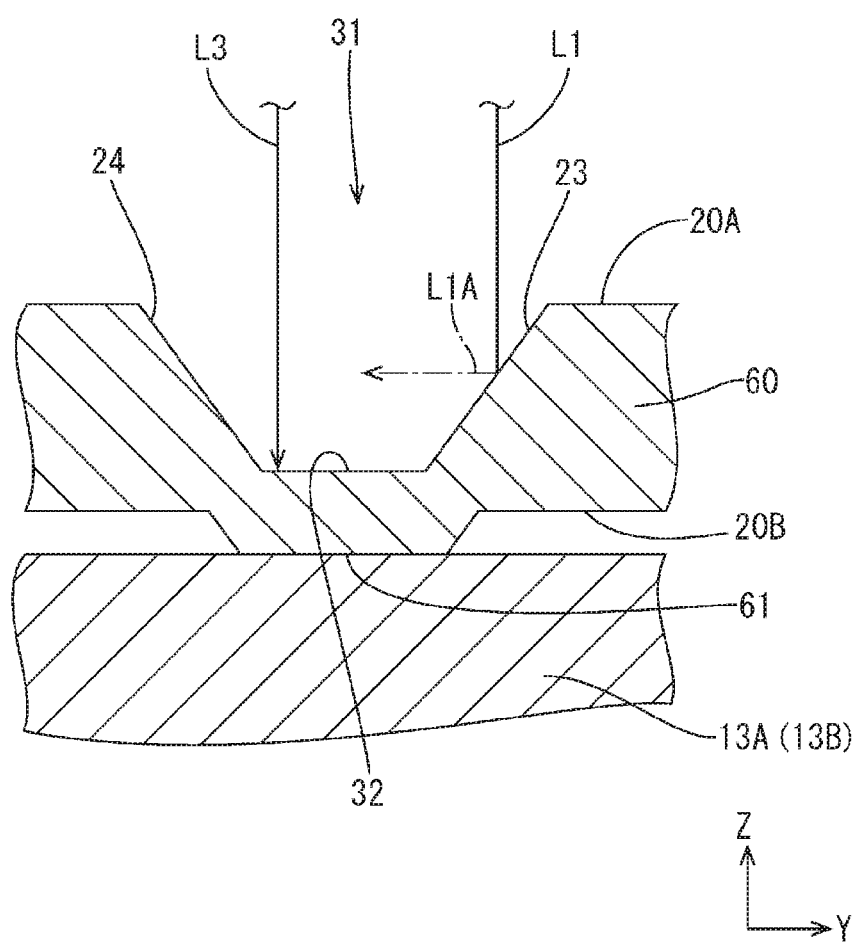
FIG. 6 is a cross-sectional view enlarging a state where a bus bar that includes a recessed portion according to Embodiment 5 is placed on an electrode terminal.

Next, Embodiment 5 will be described with reference to FIG. 6. A bus bar 60 according to Embodiment 5 has a configuration in which the flat face 32 is formed in the inner wall of each recessed portion 31 in Embodiment 2, and a protruding portion 61 is formed in the plate face 20B on the lower face side as in Embodiment 3. The same elements as those in the above embodiments are assigned the same signs, and descriptions thereof are omitted. As shown in FIG. 6, the protruding portion 61 is slightly tapered on the leading end side, and the lower end face thereof has a flat shape parallel to the plate face 20B. The protruding portion 61 can be molded simultaneously with the recessed portion 31 by means of pressing.

Embodiment 6

Figure 7:
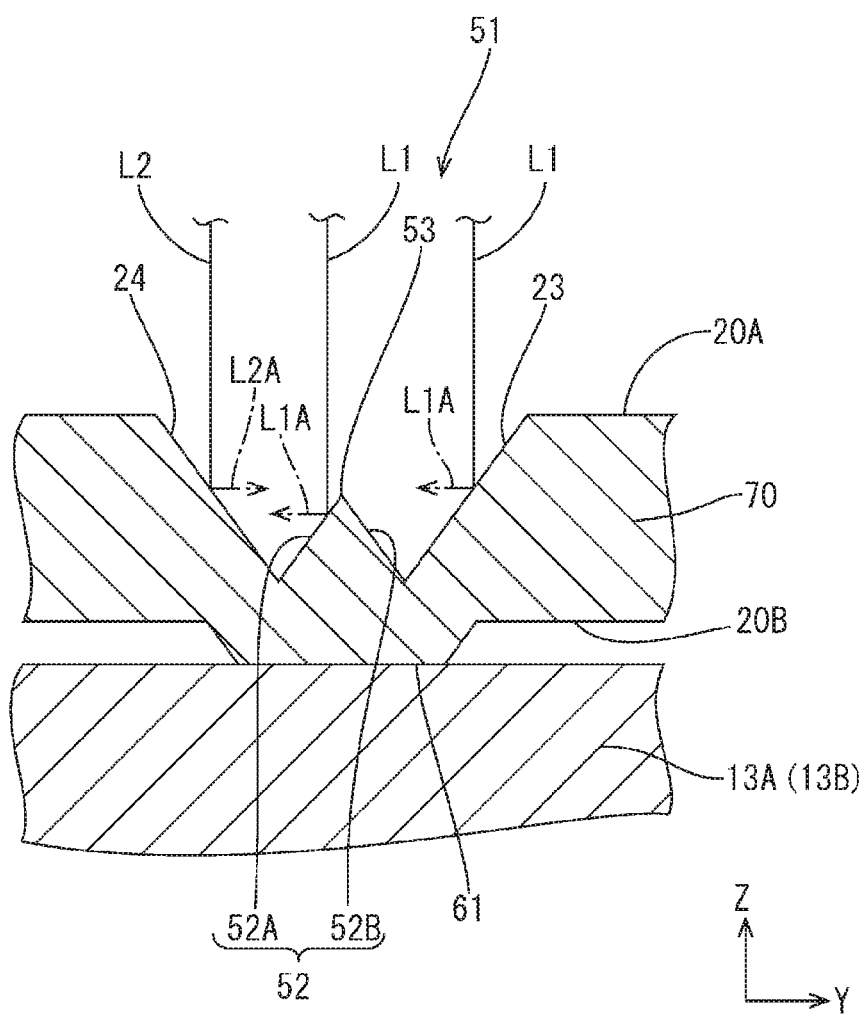
FIG. 7 is a cross-sectional view enlarging a state where a bus bar that includes a recessed portion according to Embodiment 6 is placed on an electrode terminal.

Next, Embodiment 6 will be described with reference to FIG. 7. A bus bar 70 according to Embodiment 6 has a configuration in which the projecting portion 52 is provided in the inner wall of each recessed portion 51 in Embodiment 4, and a protruding portion 61 is formed in the lower plate face 20B, as shown in FIG. 7. The same elements as those in the above embodiments are assigned the same signs, and descriptions thereof are omitted.

Embodiment 7

Figure 8:
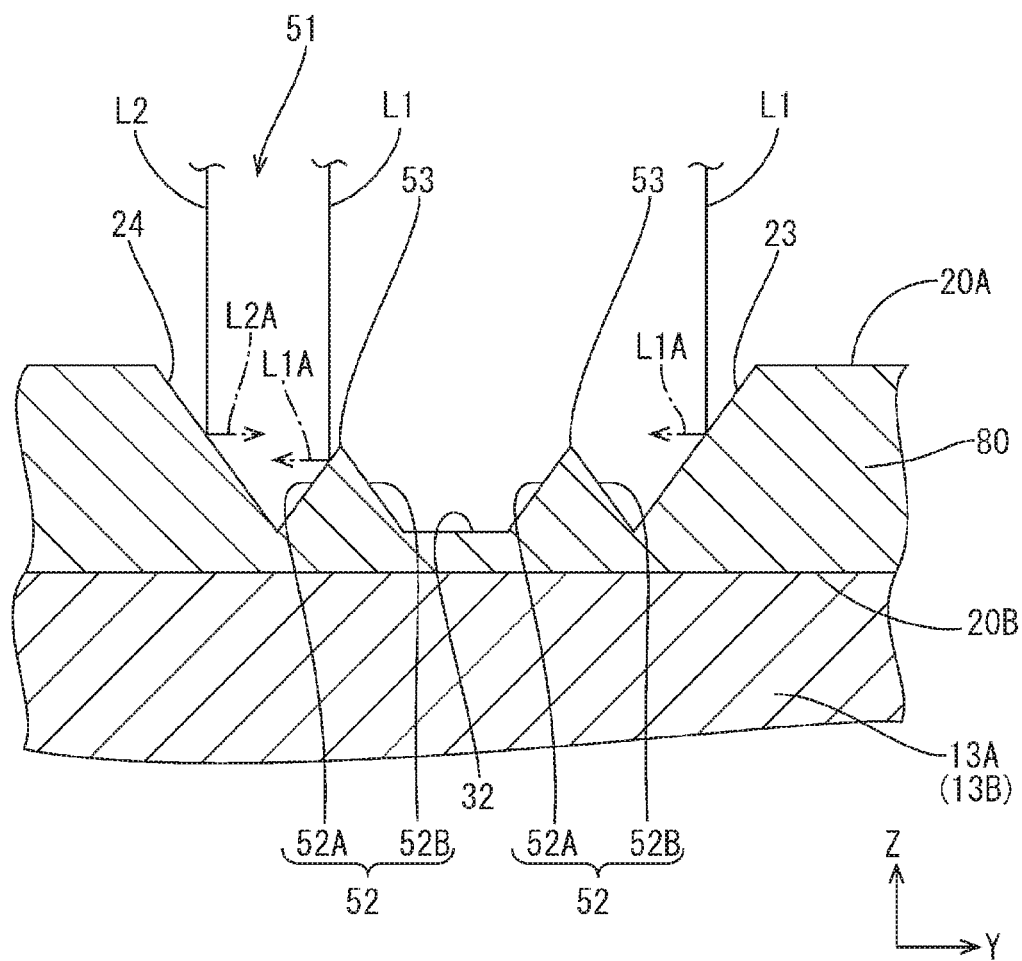
FIG. 8 is a cross-sectional view enlarging a state where a bus bar that includes a recessed portion according to Embodiment 7 is placed on an electrode terminal.

Next, Embodiment 7 will be described with reference to FIG. 8. In a bus bar 80 according to Embodiment 7, the flat face 32 is formed between a pair of projecting portions 52 that are arranged at positions adjacent to the inner side of the first light-receiving face 23 and the second light-receiving face 24, as shown in FIG. 8. The same elements as those in the above embodiments are assigned the same signs, and descriptions thereof are omitted.

Embodiment 8

Figure 9:
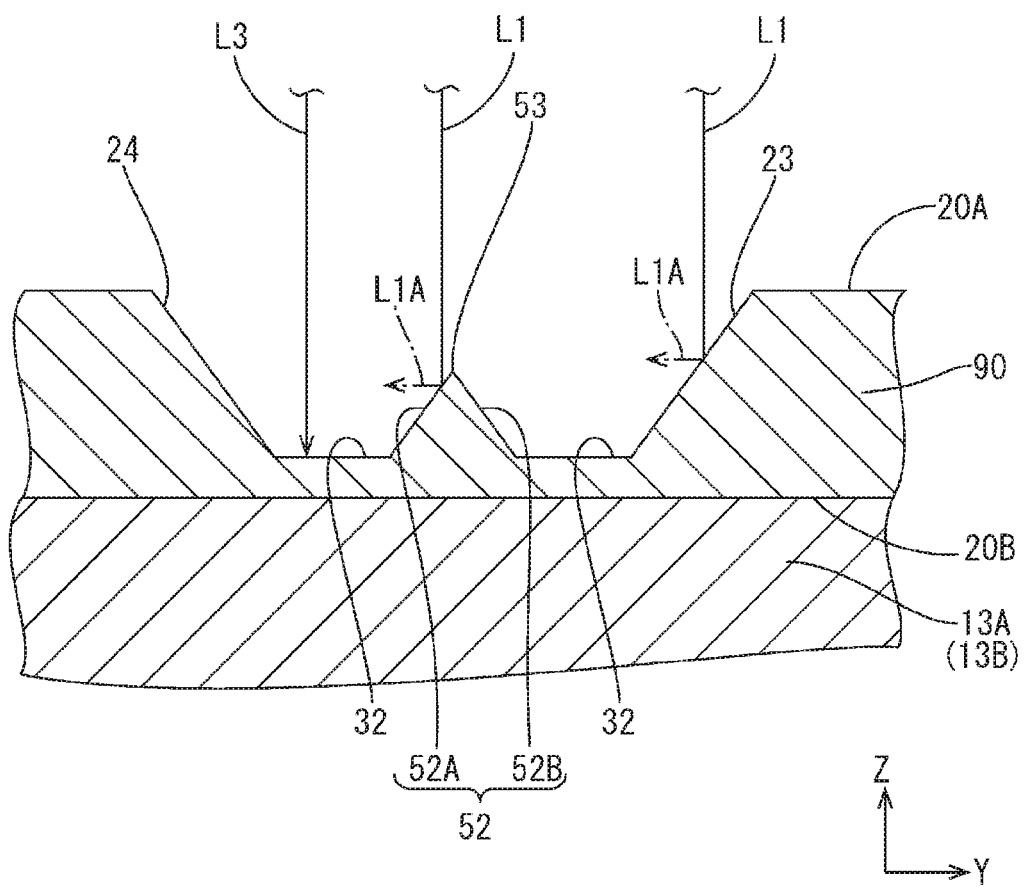
FIG. 9 is a cross-sectional view enlarging a state where a bus bar that includes a recessed portion according to Embodiment 8 is placed on an electrode terminal.

Next, Embodiment 8 will be described with reference to FIG. 9. In a bus bar 90 according to Embodiment 8, the projecting portion 52 is formed between flat faces 32 that are arranged at positions adjacent to the inner side of the first light-receiving face 23 and the second light-receiving face 24, as shown in FIG. 9. The same elements as those in the above embodiments are assigned the same signs, and descriptions thereof are omitted.

Other Embodiments

The technique described in this specification is not limited to the embodiments described with the above description and the drawings, and for example, the following embodiments are also encompassed in the technical scope described in this specification.

The number of power storage elements 11 that constitute the power storage module 10 is not limited to the number in the above embodiments, and may be any number. The number of bus bars 20 may also be changed in accordance with the number of power storage elements 11. The above-described power storage element 11 is a battery, but is not limited thereto, and may also be a capacitor or the like.

In the regions of the bus bar 20 that are placed over the electrode terminals 13A and 13B, the shape and size of the welding regions 21A and 21B to which the laser light beams L1 and L2 are applied are not limited to the shape and size in the above embodiments. For example, the entire electrode terminals 13A and 13B may also be the welding regions 21A and 21B, or the shape of the welding regions 21A and 21B may also be a linear shape, a lattice shape, or the like.

The number of recessed portions 22 in the welding regions 21A and 21B may be changed to any various numbers. For example, one recessed portion 22 may also be provided in each one of the welding regions 21A and 21B.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

10: Power storage module
11: Power storage element
13A, 13B: Electrode terminal
20, 40, 50, 60, 70, 80, 90; Bus bar
20A: Upper plate face
20B: Lower plate face
21A, 21B: Welding region
22, 31, 51: Recessed portion
23: First light-receiving face
24: Second light-receiving face
30: Bus bar
32: Flat face
41, 61: Protruding portion
52: Projecting portion
52A, 52B: Inclined face
L1, L2, L3: Laser light beam

The invention claimed is:

1. A bus bar that includes a metal plate material,
wherein the metal plate material includes a first plate face and a second plate face, the first plate face including a recessed portion,
an inner wall of the recessed portion includes a first light-receiving face that is inclined relative to the first plate face and the second plate face so as to receive a laser light beam extending in a direction perpendicular to the first plate face and the second plate face,
a second light-receiving face that receives the laser light beam that has reflected off the first light-receiving face, and
a protruding portion is formed at a position corresponding to the recessed portion, in the second plate face on a side opposite to the first plate face on a side on which the recessed portion is formed, wherein the protruding portion is tapered inwardly as the protruding portion extends away from the second plate face and toward a lower end face of the protruding portion, and the lower end face of the protruding portion has a flat shape that is parallel to the second plate face,
wherein a projecting portion is provided in the inner wall of the recessed portion, and the projecting portion includes an inclined face that is inclined relative to the first plate face so as to receive a laser light beam extending in a direction perpendicular to the first plate face.

2. The bus bar according to claim 1,
wherein the second light-receiving face is inclined relative to the first plate face, in an orientation in which the second light-receiving face reflects the laser light beam outward.

3. The bus bar according to claim 1,
wherein the inner wall of the recessed portion includes a flat face that is parallel to the first plate face.

4. A power storage module comprising:
the bus bar according to claim 1; and
a power storage element including positive and negative electrode terminals,
wherein the bus bar is laser-welded to the positive and negative electrode terminals.

* * * * *